(12) United States Patent
Stuff et al.

(10) Patent No.: US 6,422,518 B1
(45) Date of Patent: Jul. 23, 2002

(54) AIRCRAFT WITH MEANS FOR A PREMATURE BREAKDOWN OF THE WING VORTEX PAIR

(75) Inventors: Roland Stuff; Heinrich Vollmers, both of Göttingen (DE)

(73) Assignee: Duetsche Zentrum fur Luft- und Raumfahrt E.V., Bonn (DE)

(*) Notice: Subject to any disclaimer, the term of this patent is extended or adjusted under 35 U.S.C. 154(b) by 0 days.

(21) Appl. No.: 09/692,434

(22) Filed: Oct. 19, 2000

(30) Foreign Application Priority Data

Oct. 20, 1999 (DE) ......................................... 199 50 403

(51) Int. Cl.⁷ .......................................... B64C 23/06
(52) U.S. Cl. .................. 244/199; 244/45 R; 244/45 A; 244/130; 244/201
(58) Field of Search .............................. 244/199, 45 R, 244/45 A, 204, 201, 130, 213

(56) References Cited

U.S. PATENT DOCUMENTS

| | | | |
|---|---|---|---|
| 4,017,041 A | 4/1977 | Nelson | 244/40 |
| 4,569,494 A | 2/1986 | Sakata | 244/199 |
| 4,718,620 A | 1/1988 | Braden et al. | 244/130 |
| 5,230,486 A | 7/1993 | Patterson, Jr. | 244/199 |
| 6,042,059 A | * 3/2000 | Bilanin et al. | 244/199 |
| 6,082,679 A | * 7/2000 | Crouch et al. | 244/199 |
| 6,318,677 B1 | * 11/2001 | Dixon | 244/199 |

FOREIGN PATENT DOCUMENTS

| | | | |
|---|---|---|---|
| DE | 3127257 A1 | 7/1981 | |
| GB | 2 051 706 A | 6/1980 | B64C/3/50 |
| WO | PCT/US98/11569 | 6/1998 | B64C/23/06 |

OTHER PUBLICATIONS

Combined Search and Examination Report under Sections 17 and 18(3), Dec. 18, 2000, 5 pages.
Inventors' comments on the documents as cited in the Combined Examination and Search Report, 2 pages.

* cited by examiner

*Primary Examiner*—J. Woodrow Eldred
(74) *Attorney, Agent, or Firm*—Thomas, Kayden, Horstemeyer & Risley

(57) ABSTRACT

For a premature breakdown of a wing vortex pair $+/-\Gamma_M$ behind an aircraft in flight (1) comprising a symmetry plane (7), two wings (3), a fuselage (2) and a horizontal tail plane (HTP) (4), the wing vortex pair $+/-\Gamma_M$ being generated in the area of the tips of the wings (3), having a first spin direction and descending behind the aircraft, an interfering vortex pair $-/+\Gamma_P$, which is generated between the fuselage (2) and the tips of the wings (3) without merging already in the near field behind the wing (3) with the wing vortex pair $+/-\Gamma_M$ and which has a second spin direction that is opposed to the first spin direction, is retained behind the aircraft (1) in an altitude range of the wing vortices of the wing vortex pair $+/-\Gamma_M$ by adjusting to suitable values the relative circulation and the relative span of the interfering vortex pairs $-/+\Gamma_P$, each related to the wing vortex pair $+/-\Gamma_M$. The interfering vortex pair $-/+\Gamma_P$ includes portions of a fuselage vortex pair $-/+\Gamma_F$, which is generated in the junction area of the wings (3) to the fuselage (2), and a tail plane vortex pair $-/+\Gamma_H$, which is generated in the area of the wing tips (5) of the horizontal tail plane (4).

13 Claims, 8 Drawing Sheets

AIRCRAFT WITH MEANS FOR A PREMATURE BREAKDOWN OF THE WING VORTEX PAIR

FIELD OF THE INVENTION

The invention relates to an aircraft comprising a symmetry plane, two wings, a fuselage, a horizontal tail plane (HTP) and with means for a premature breakdown of a wing vortex pair behind the aircraft in flight, which pair is generated in the tip area of the wings, has a first spin direction and descends in the near field behind the aircraft.

The invention deals in particular with the premature breakdown of the wing vortex pair behind an aircraft in landing flight. However, it is also advisable to apply the invention to an aircraft in climbing or cruise flight.

BACKGROUND OF THE INVENTION

The wing vortices of the wing vortex pair are generated at an aircraft in flight by the rolling up of the vortex sheet shed from the wing tip area. The trailing vortices are particularly strong in landing approach. Especially with the advent of wide body aircraft the wing vortices, due to the trailing vortices they generate, are a hazard for other aircraft since the force of the wing vortices, which hereafter is called circulation, is essentially proportional to the weight of the respective aircraft. Hence, particularly heavy aircraft generate particularly strong wing vortices. Thus, the horizontal spacings between landing aircraft, that are necessary for air traffic safety, increase with the weight of the aircraft in front and are several nautical miles with the presently common wide body aircraft, such as Boeing type B-747. It is these large horizontal spacings for the avoidance of wake vortex encounters that prevent a marked increase in the passenger volumes per hour by even larger capacity aircraft since the admissible landing frequency of such larger aircraft further decreases with their increasing weight.

A method for a premature breakdown of wing vortex pairs is known from Ludwieg: "Vortex breakdown", DLR-Report 70–40, 1970. The paper shows, that a vortex breaks down due to the Rayleigh-Ludwieg instability, if another vortex with an opposite rotation appears on its periphery. The condition that it appears on the periphery has been formulated by Steven C. Rennich et al.: "A Method for Accelerating the Destruction of Aircraft Wake Vortices", AIAA 98–0667, 1998. This publication deals with theoretical models and calculations that are restricted to an external vortex pair as a wing vortex pair and an internal vortex pair with opposite spin direction as a interfering vortex pair. The basic assumption is that, under practical conditions, the external vortex pair is generated at the wing tips and the outside edges of the trailing and leading edge flaps while the internal vortex pair, due to the lift loss, occurs over the fuselage and at the inside edges of the landing flaps. Though a general observation is made that under practical conditions the entire vortex sheet should be considered, there is no reference to any specific further vortex sheets and vortex pairs. Regarding the internal vortex pair it is stated that its relative circulation and relative span in relation to the circulation and the span of the wing vortex pair have to be in a certain range so that the structure of the wing vortex pair can be destroyed due to as a result of the interaction with the interfering vortex pair behind the aircraft in flight. However, if the circulation of the interfering vortex pair is too high the interaction between the two single vortices of the interfering vortex pair is such that they escape to the above and thus the desired interaction, i.e. to destroy the structure of the wing vortices descending behind the aircraft, will not take place. No concrete actions are outlined to prevent the circulation of the interfering vortex pair from becoming too high. In addition, the consideration of the vortex sheets that are shed from the inside span area of an aircraft by only one interfering vortex pair is a very crude simplification since, for instance, vortex sheets that are shed from the aircraft near the horizontal tail plane have not yet rolled up into a defined vortex pair. A less crude simulation of the shed vortex sheets shows that the latter do not escape completely to the above as one interfering vortex but that parts of such already descend with the wing vortices while, according to Rennich et al., their total circulation should make them wholly escape above. Hence, the criterion proposed by Rennich and Lele is replaced by a criterion that is further described below and which considers the vortex sheets more profoundly than the criterion adopted by Rennich and Lele.

This invention is aimed at making use of the interfering vortex pair that is already existing at an aircraft in flight for a premature breakdown of the wing vortex pair to basically reduce its circulation.

SUMMARY OF THE INVENTION

Briefly described, this object is achieved by an aircraft comprising a symmetry plane, two wings, a fuselage, a horizontal tail plane and means for a premature breakdown of a wing vortex pair $+/-\Gamma_M$, which is generated in the wing tip area at an aircraft in flight, which has a first spin direction and which descends behind the aircraft, in that the means for said premature breakdown adjust the circulation $\Gamma_P$ and the relative span $b_P$— each related to the wing vortex pair—of an interfering vortex pair $-/+\Gamma_P$, which is generated between fuselage and wing tips without merging with the wing vortex pair already in the near field behind the wings, which has a second spin direction that is opposed to the first spin direction and which includes portions of both a fuselage vortex pair $-/+\Gamma_F$ generated in the wing-fuselage junction area, and a tail plane vortex pair $-/+\Gamma_H$ generated in the wing tip areas (5) of the horizontal tail plane (4), to appropriate values in order to retain the interfering vortex pair $-/+\Gamma_P$ behind the aircraft within an altitude range of the descending wing vortices of the wing vortex pair.

This invention is based on the finding that the internal vortex pair which absorbs portions of the fuselage vortex and the tail plane vortex pairs, is particularly suited as an interfering vortex pair. The fuselage vortex pair is caused by the lift loss over the fuselage at the wing-fuselage junction area and always has a spin direction opposed to the wing vortex pair. The tail plane vortex pair is generated in the wing tip area of the horizontal tail plane which generates a downward lift in order to stabilize the desired angle of attack of the entire aircraft, so that also the tail plane vortex pair has a spin direction that is opposed to that of the wing vortex pair. Fuselage vortex pair and tail plane vortex pair merge into one internal vortex pair behind the aircraft. On the one hand the span between the two single interfering vortices of this interfering vortex pair is so small and, on the other, the distance to the wing vortex is so large that there is no risk for the merging of the interfering vortex pair with the wing vortex pair already in the near field behind the aircraft. Such a merging with the not yet aged wing vortex pair would cause a certain reduction of its circulation but not the desired premature breakdown of its structure. The reviewed interfering vortex pair with portions of the fuselage vortex and the tail plane vortex pairs typically has such a high circulation in the known wide body transport aircraft that, without a purposeful intervention, it would escape to the above from the area of the descending wing vortex pair due to the small span of its two opposed interfering vortices. As a counteraction the new method features an adjustment of the circulation and the relative span between said interfering vortex pairs to such values that the interfering vortex pair is retained in the altitude range of the descending wing vortices of the wing vortex pair. This means that the circulation of the naturally occurring interfering vortex pair with portions of the fuselage vortex and tail plane vortex pairs usually has to be reduced.

The use of winglets for said reduction can reduce, or, compensate the additional aerodynamic drag of the winglets, which is due to the propulsion they generate by their local oncoming airflow, or even overcompensate it in terms of a net propulsion. The definition for winglets in this context is that these are small wings that are not blown against in the main undisturbed flow direction, i.e. not opposed to the overall moving direction of the aircraft. The air-flow hitting the winglets is part of the flow around the entire aircraft whose direction may considerably deviate locally from the direction of the undisturbed flow, such as at a wing tip.

The interfering vortex pair, which, according to the present invention, is used for a premature breakdown of the wing vortex pair circulation, can also have a portion of a flap vortex pair that is generated in the area of the inside edges of a landing flap pair at the wings. When there is a merging of such flap vortex pair with the fuselage vortex and the tail plane vortex pairs also its portion in the circulation during the retaining of the interfering vortex pairs in the altitude range of the wing vortices is to be considered. It goes without saying that it has to be borne in mind here that flap vortex pairs cannot be observed in sufficient strength in all flight situations and vanish completely when the landing flaps are retracted. However, during the especially interesting landing approach the landing flaps are typically fully taken out. On the other hand, it has to be seen to that the circulation of the interfering vortex pairs is not too grossly reduced by possible winglets when reducing the wing vortices in cruise flight, after the essential portions of the flap vortex and tail plane vortex pairs have fallen away.

The interesting interfering vortex pair can also have a portion of a generator vortex pair that is generated by a pair of vortex generators with the first or second spin direction. The vortex generators can be integrated, for instance, into the structure of the main gear of the aircraft. The arbitrary generation of vortices by means of vortex generators makes it possible to subject both the circulation of an interfering vortex pair and its span to a specific adjustment. The generator vortex pair can have both the second spin direction, which coincides with the interfering vortex pair spin direction, and the first spin direction of the wing vortex pair. In the latter case the generator vortex pair already causes a principal reduction of the interfering vortex pair circulation since the latter's portion is negative here. A vortex generator can be used, e.g., in order to generate a generator vortex pair with the first spin direction at a landing gear which more or less compensates the portion of a flap vortex pair with the second spin direction in landing flight, so that the circulation of the entire interfering vortex pairs in landing approach is reduced to near the desired value.

One embodiment of the new method arranges at least one winglet pair behind the wings at the fuselage. There the winglets make an impact on those vortex sheets which subsequently are shed from the wing-fuselage junction area.

When at least one winglet pair is arranged at the wing tips of the horizontal tail plane the winglets make an impact on the vortex sheets shed from the horizontal tail plane by enlarging the effective aspect ratio and the effective span of the horizontal tail plane.

When at least one winglet pair is arranged in the inside edge area of a landing flap pair at the wings the winglets make an impact on the shed vortex sheets, which subsequently form the flap vortex pair.

The impact of the winglets on the shed vortex sheets means in any case a reduction of the circulation of those vortex pairs that emerge from the vortex sheets.

As already indicated above in connection with the difference between landing and cruise flight the relative circulation of the interfering vortex pairs is not always the same without intervention by means of winglets according to the present invention. Hence, a fixed arrangement of winglets can only achieve an optimum circulation reduction of the wing vortex pair in certain flight phases. If all three flight phases, i.e. climbing, cruise and landing approach shall be covered, e.g. the active length and/or the angle of attack of at least one winglet pair will have to be modified for an optimal adjustment of the interfering vortex pair circulation to the specific current value. It is also possible to extend individual winglet pairs only under certain flight conditions or to angle them into an active alignment.

The reduction of the relative circulation of the interfering vortex pair according to the present invention must, however, not be made to the extent that the interfering vortex pair circulation is reduced to a value that is only 15% of the wing vortex pair circulation or even smaller. Otherwise the circulation of the interfering vortex pair, even if it does not escape from the altitude range of the descending wing vortices, is too low as to be capable of reliably destroying the wing vortex pair structure.

In a new aircraft also the aspect ratio and the span of the horizontal tail plane can be increased as a means for a premature breakdown of the wing vortex pair. The increase of the aspect ratio and span of the horizontal tail plane as a means for a premature breakdown of the wing vortices has the advantage that the aerodynamic drag is reduced by a reduction of the induced drag.

Also a canard wing can be attached as a means for a premature breakdown of the wing vortex pair. This is an additional horizontal tail plane in front of the wings which provides a lift and not a downward lift like a conventional horizontal tail plane that is located behind the wings. Then the dimensions of the conventional horizontal tail plane and the canard wing are coordinated with each other in such a way that the interfering vortex pair descends with the wing vortex pair.

Alternatively or additionally a short flap can be attached to the wing trailing edge, which ends flush with the fuselage but is free at the other end so that an additional descending vortex pair is generated which increases the effective relative span of the tail plane vortex pair that is shed from the horizontal tail plane.

Below the invention is explained and described in greater detail by means of practical examples.

DETAILED DESCRIPTION

Figure 1:
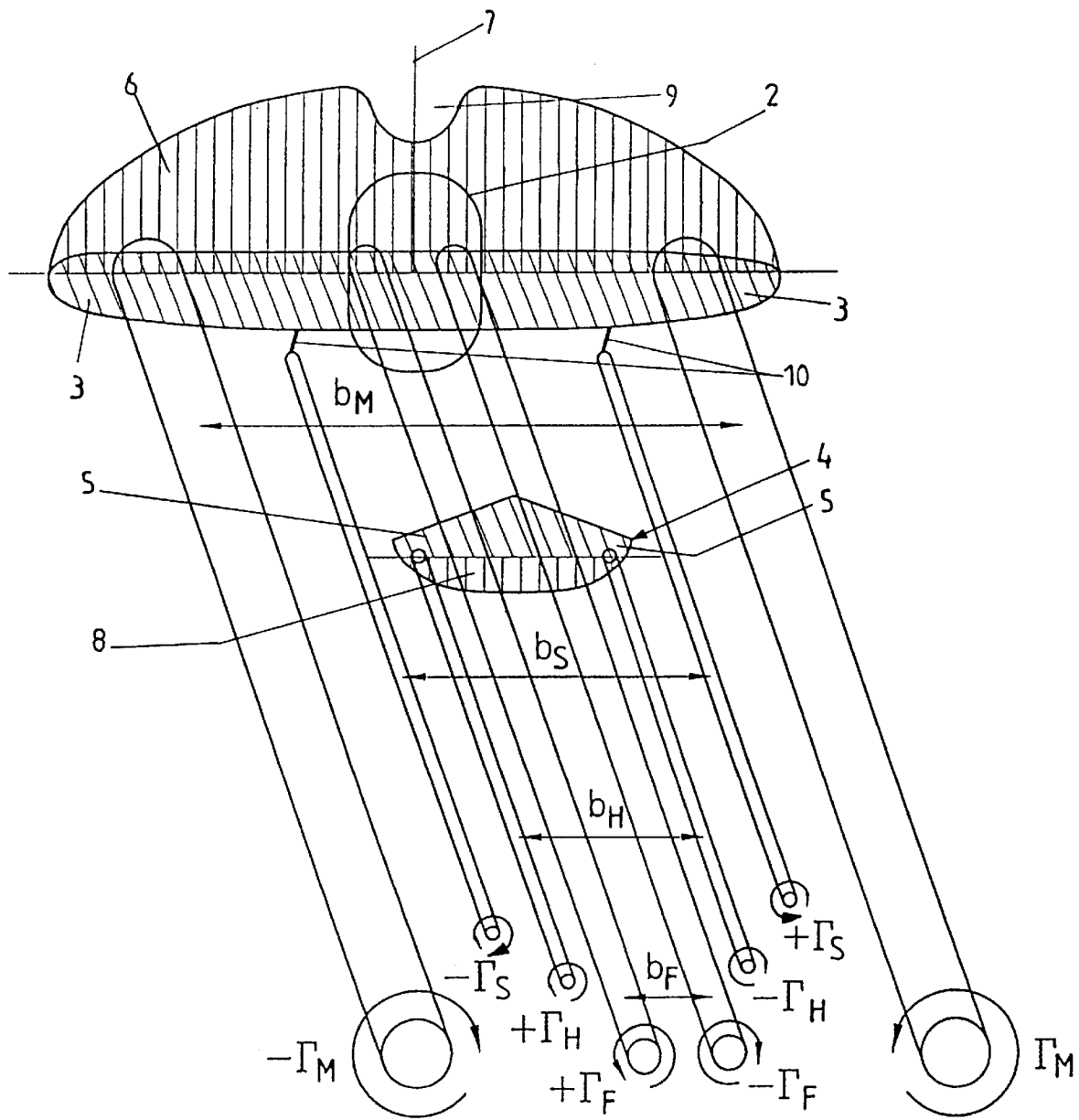
FIG. 1 shows an arrangement of different vortex pairs shed from an aircraft in flight.

FIG. 1 indicates an aircraft 1 by a cross section of its fuselage 2, its two wings 3 and its horizontal tail plane (HTP) 4. The symmetry plane 7 of the aircraft 1 is drawn as a line in the cross-sectional area of the fuselage 2 and the wings 3. Outlined are also the lift 6 above the wings 3 and the HTP downward lift 8 below the horizontal tail plane 4. The local gradient of the lift 6 generates a wing vortex pair $+/-\Gamma_M$ in the area of the tips of the wings 3. The gradient of the lift 6 also generates, in the area of a lift loss over fuselage 9 above the fuselage 2, a fuselage vortex pair $-/+\Gamma_F$ whose spin direction is opposed to the spin direction of the wing vortex pair $+/-\Gamma_M$. The gradient of the HTP downward lift 8 at the horizontal tail plane 4 generates a tail plane vortex pair $-/+\Gamma_H$ whose spin direction is again opposed to the spin direction of the wing vortex pair $+/-\Gamma_M$ and thus the same as the spin direction of the fuselage vortex pair $-/+\Gamma_F$. An additional vortex pair is depicted here in the form of a winglet-generated vortex pair $+/-\Gamma_S$, which may have the same spin direction as the wing vortex pair $+/-\Gamma_m$. However, it would basically also be possible to replace the winglets 10, that are not depicted in detail in FIG. 1, by vortex generators which generate a further vortex pair $-/+\Gamma S$, i.e. a vortex pair with a spin direction that is opposed to that of the wing vortices $+/-\Gamma_m$. Essential for the further consideration are not only the circulations $\Gamma_H$, $\Gamma_F$, $\Gamma_S$ and $\Gamma_M$ of the vortex pairs but also their respective relative spans $b_H$, $b_F$, $b_S$ and $b_M$ which are also shown into FIG. 1.

Figure 2:
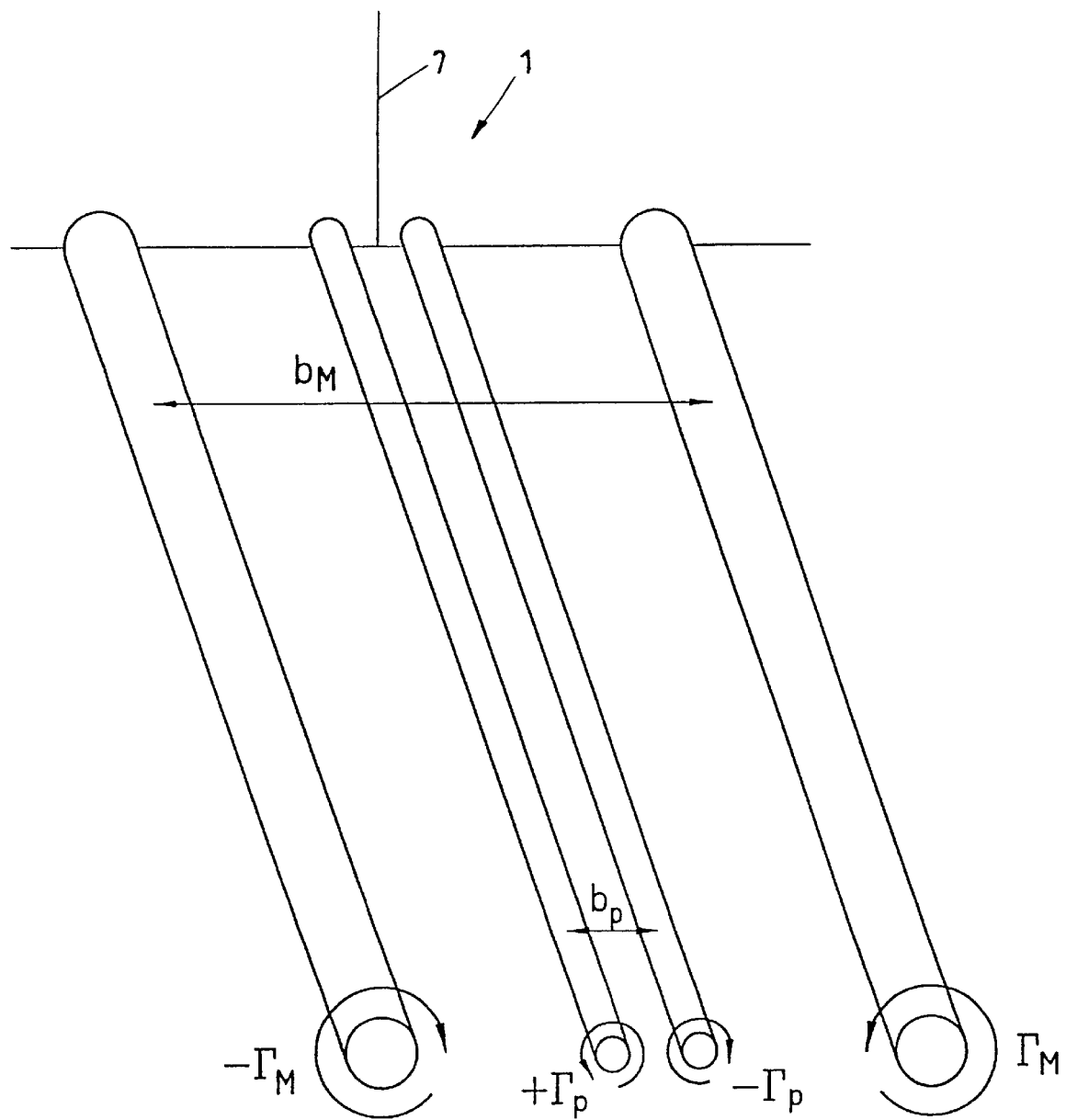
FIG. 2 shows a merging of the vortex pairs as shown in FIG. 1 into one wing vortex pair and one interfering vortex pair.

The impacts of the vortex pairs $-/+\Gamma_H$, $-/+\Gamma_F$, $+/-\Gamma_S$ on the wing vortex pair $+/-\Gamma_M$ can be represented likewise—by way of substitution—by a single vortex pair $-/+\Gamma_P$, here denoted as interfering vortex pair, with a span $b_P$, which is shown in FIG. 2 and described by $$-\Gamma_P = (\Gamma_H + \Gamma_F - \Gamma_S) \quad (1)$$

and $$bp = \frac{b_H \Gamma_H + b_F \Gamma_F - b_S \Gamma_S}{\Gamma_P}, \quad (2)$$

Here the span $b_P$, of the two interfering vortices of the interfering vortex pair $-/+\Gamma_P$ is so small and thus the distance of the two interfering vortices to the wing vortices so large that the interfering vortex pair $-/+\Gamma_P$ does not merge with the wing vortex pair $+/-\Gamma_m$ already in the near field behind the aircraft 1 before the wing vortex pair $+/-\Gamma_m$ is subjected to a certain aging. As for the rest, also the wing vortex pair $+/-\Gamma_M$, as shown in FIGS. 1 and 2 comprises different portions of individual vortex pairs in the area of the tips of the wings 3. These are, for instance, besides the actual wing vortices that are generated at the tips of the wings 3, flap vortex pairs which are generated at the outside edges of flaps at the wings 3. The circulation and the span of each of the vortex pairs, which consist of several portions, respectively correspond to the sum total of the circulations and the mean value of the spans of the individual portions weighted with the respective circulation.

Figure 3:
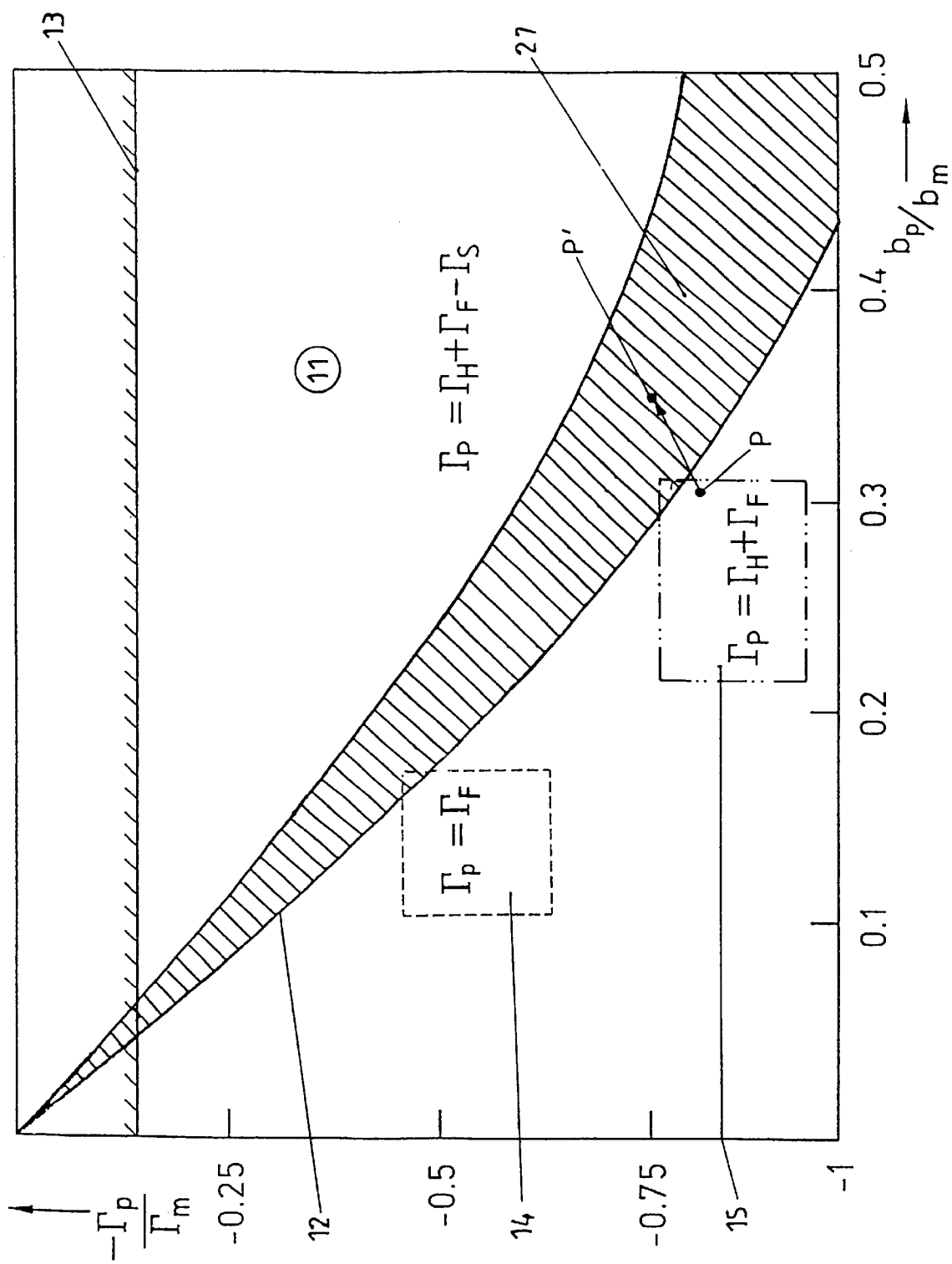
FIG. 3 illustrates a criterion for the relative circulation of the interfering vortex pair as a function of its relative span, each related to the wing vortex pair.

FIG. 3 is a graphic presentation of a criterion for the relative circulation of the interfering vortex pairs $-\Gamma_P/\Gamma_M$ as a function of the relative span of the interfering vortex pairs $b_P/b_M$. The admissible range of values 11 is limited by a straight upper line 13 and by the hatched area 27. The hatched area 27 is limited at the bottom by a boundary line 12 that is defined by a curve $$-\Gamma_P/\Gamma_M = f^*(3(b_P/b_M) + (b_P/b_M)^3)/(1 + 3(b_P/b_M)^2)$$

with f=1.15. Here the hatched area 27 is given for elliptical lift distributions of the wing and the horizontal tail plane. The respective vortex sheets are represented not by one but by 80 vortex pairs each. These vortex pairs are used as an initial solution to the vortex-line method after Rom: "High Angle of attack Aerodynamics" Springer, 1996, in order to calculate the percentage of the relative circulation $-\Gamma_P/\Gamma_M$, which descends with the wing vortices. The boundary line 12 indicates 0%, the upper line of the hatched area 100%. This transitional area is reflected by the factor f, which varies from 0.85 to 1.15. For a particular aircraft the diagram of FIG. 3 can be more refined by taking the vortex sheet, for example, as measured in a wind-tunnel, as an initial solution to the method of Rom. This way different lengths of fuselage, configurations of tail planes, such as, T-tail or conventional tail, wing-fuselage junctions, such as, high-, mid-, and low wing configurations can be taken into account. With the aircraft configuration known every aircraft is characterized by a point in the diagram of FIG. 3. If this point falls into the hatched area a percentage can be taken out of the diagram. This percentage is multiplied with the relative circulation $-\Gamma_P/\Gamma_M$ in order to obtain that portion of $-\Gamma_P/\Gamma_M$, which descends with the wing vortex pair. A premature breakdown of the wing vortex pair was already observed at $-\Gamma_P/\Gamma_M = -0.15$ by Coton: "Caracterisation et Modelisation du Sillage d'un Avion a partir d'Essais en Vol de Maquettes en Laboratoire" in Agard-Cp-584 on "The Characterisation and Modification of Wakes from lifting vehicles in Fluids" pp 28-1 to 28-21, 1996. Thus, the descending portion as given by $(-\Gamma_P/\Gamma_M \times \text{percentage})$ should be higher than 0.15. This way it can be assured, that the circulation of the interfering vortex pair is not so high that the interfering vortices, due to their interaction, escape from the altitude range between the descending wing vortices of the wing vortex pair $+/-\Gamma_M$. The boundary line 13 runs just under $-\Gamma_P/\Gamma_M = -0.15$ and represents the criterion that the $\Gamma_P$ of the interfering vortex pairs $-/+\Gamma_P$ has to have a certain minimum value, so that the interaction of the interfering vortex pairs with the aged wing vortex pair $+/-\Gamma_M$ at a distance behind the aircraft results in the premature destruction of the wing vortices, i.e. their structure is destroyed. In addition, FIG. 3 depicts two ranges of values 14 and 15 which illustrate the circulations $\Gamma_P$ of known wide body aircraft under consideration respectively of only the wing vortex pair $-/+\Gamma_F$ and the wing vortex pair $-/+\Gamma_F$ and the tail plane vortex pair $-/+\Gamma_H$. It can be seen that typically the circulation $-\Gamma_P$ is below the boundary line 12, i.e. it is too high—under consideration of the fact that negative values are entered for $-\Gamma_P/\Gamma_M$. Hence, in order to get into the range of values 11, it is necessary to reduce the circulation $-/+\Gamma_P$ by adding an additional descending vortex pair, given by the circulation $+/-\Gamma_S$ and the span $b_S$, in such a manner and also to increase the span $b_P$ such that the reduced circulation $\Gamma_P$, modification, falls into the range of values 11 as shown in FIG. 3 following this.

Figure 4:
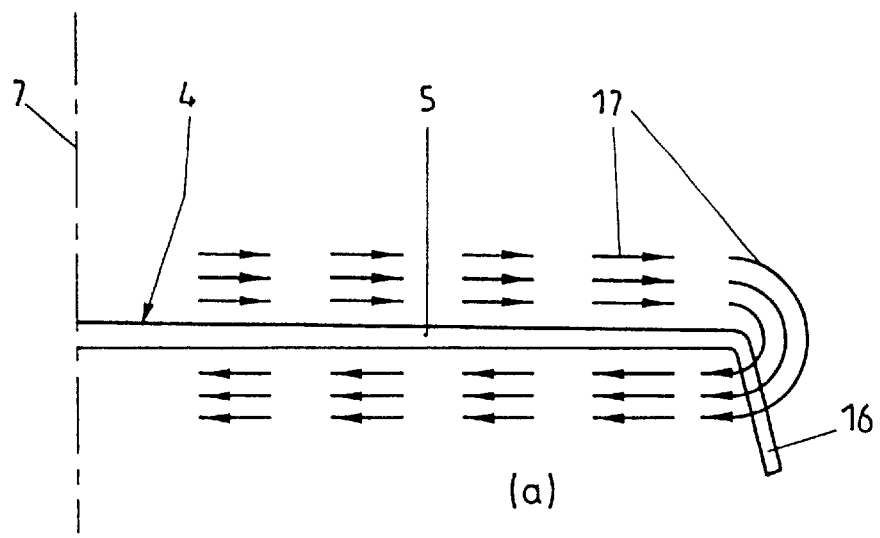
FIG. 4 shows an arrangement of a winglet at a horizontal tail plane in a rear view.
Figure 5:
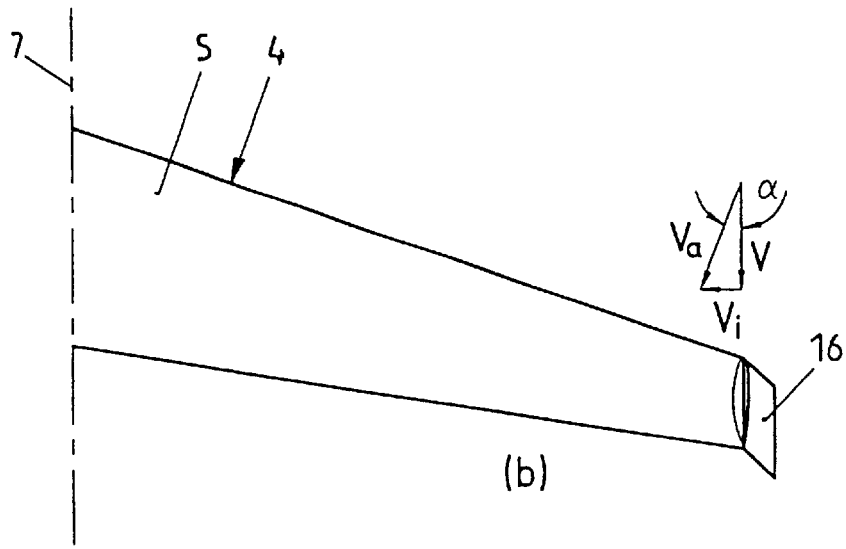
FIG. 5 show s the arrangement as shown in FIG. 4 in a top view.

To this end the new method employs, e.g., winglets in order to reduce the total circulations $\Gamma_F$, $\Gamma_H$, and $\Gamma_S$, which results in $\Gamma_P$ in comparison to the total of $\Gamma_F$ and $\Gamma_H$. FIGS. 4 and 5 sketch the arrangement of a winglet 16 at a wing tip 5 of the horizontal tail plane 4 whose function is a reduction of the tail plane vortex pair circulation $-/+\Gamma_H$ as shown in FIG. 1. This winglet 16 is blown against by the vector sum of the main undisturbed airflow, denoted V in FIG. 5, and the compensating airflow over the wing tip 5 of the horizontal tail plane 4, as indicated with arrows 17 in FIG. 4. This compensating airflow is generated by the pressure conditions at the horizontal tail plane 4 which cause the HTP downward lift 8 as shown in FIG. 1, i.e. an overpressure at the top and an underpressure at the bottom. FIG. 5 denotes this additional, induced oncoming airflow as $V_i$. This results in an effective oncoming airflow $V_a$ of the winglet 16, as also drawn in FIG. 5, which deviates by an angle α from the main airflow V.

Figure 6:
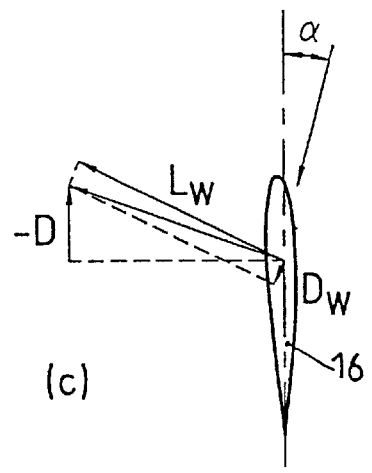
FIG. 6 shows an oncoming airflow and force relations at a winglet profile as shown in FIGS. 4 and 5.

FIG. 6 is a sketch showing that the lift $L_W$ of the winglet 16, caused by the local oncoming airflow $V_a$, has such a strong forward component that the aerodynamic drag $D_W$ of the winglet 16 is overcompensated. This means, there remains a negative induced drag −D due to the winglet 16. The result of which is that the winglet 16, as shown in FIGS. 4 and 5, does not increase the aerodynamic drag, instead even reduces it and simultaneously effects the desired reduction of the tail plane vortex pair circulation $-/+\Gamma_H$. This applies analogously also to such winglets whose arrangement is described thereunder. What proves suitable regarding the concrete dimensioning of the winglet 16, as shown in FIGS. 4 and 5, is a value standardized to the half-span of the horizontal tail plane 4 in the limits between 0.02 and 0.2 for its span in the direction of its main extension laterally to the symmetry plane 7. The sweep angle of the winglet 16 should be within the limits of 15° to 40°.

Figure 7:
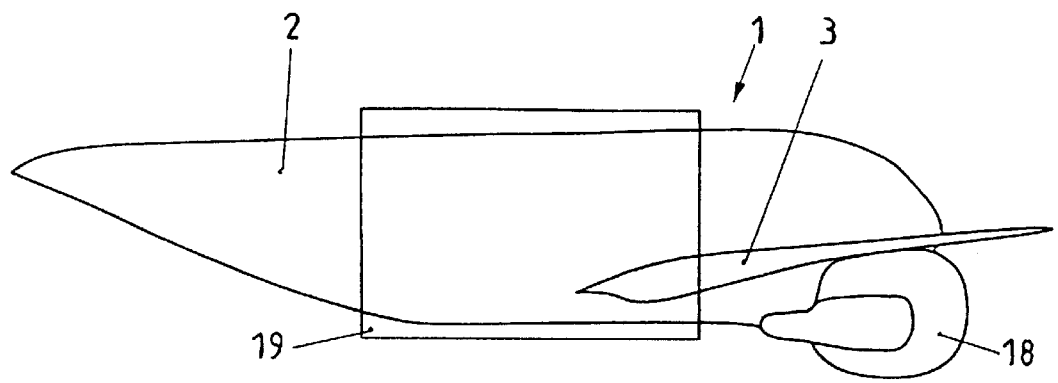
FIG. 7 is perspective view of parts of an aircraft with an enlarged detail.
Figure 8:
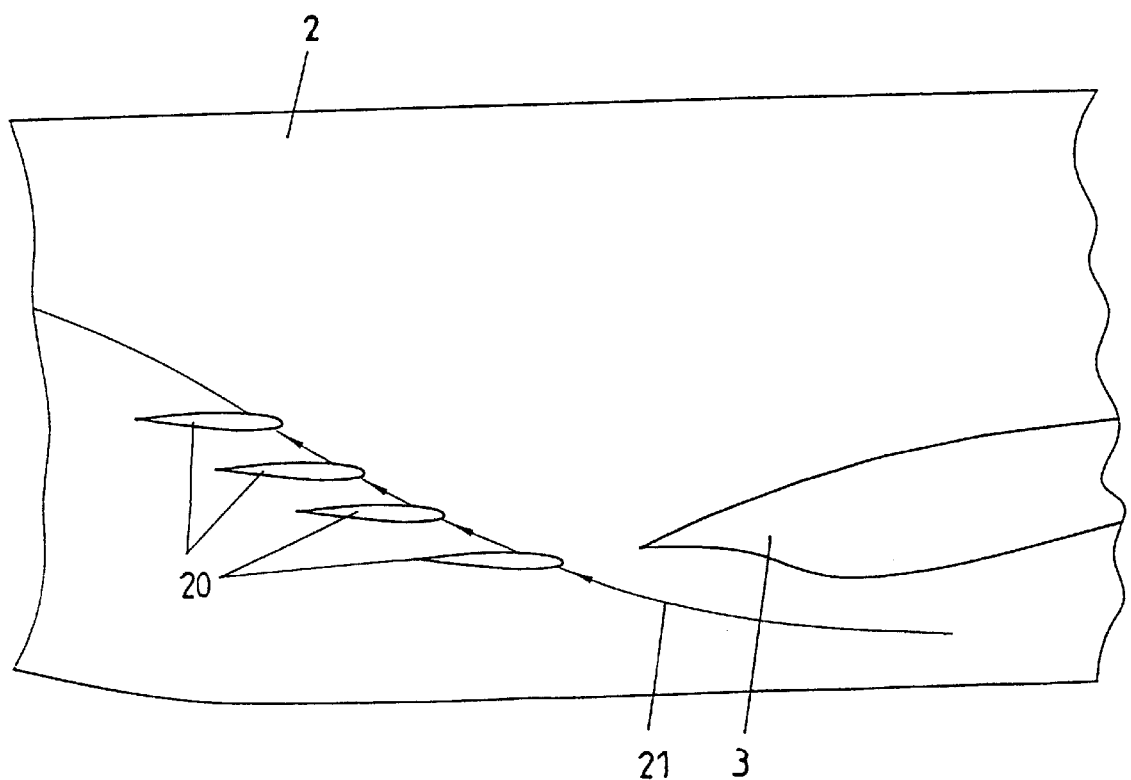
FIG. 8 is the enlarged detail as shown in FIG. 7 with an arrangement of winglets at the aircraft fuselage.

FIG. 7 is an angular rear view of the fuselage 2, one wing 3 and an engine 18 of an aircraft 1, with a detail 19 being edged whose content is separately and enlarged depicted in FIG. 8. FIG. 8 sketches the arrangement of winglets 20 at the fuselage 2 of the aircraft 1 behind the wings 3, namely in the area of a stream line 21, which is assigned to the fuselage vortex pair $-/+\Gamma_F$ that is being generated, as shown in FIG. 1. The winglets 20 act as guiding vanes for the airflow corresponding to the stream line 21 and deflect the airflow to the rear in such a manner that the circulation of the fuselage vortex pair is reduced in the desired sense.

Figure 9:
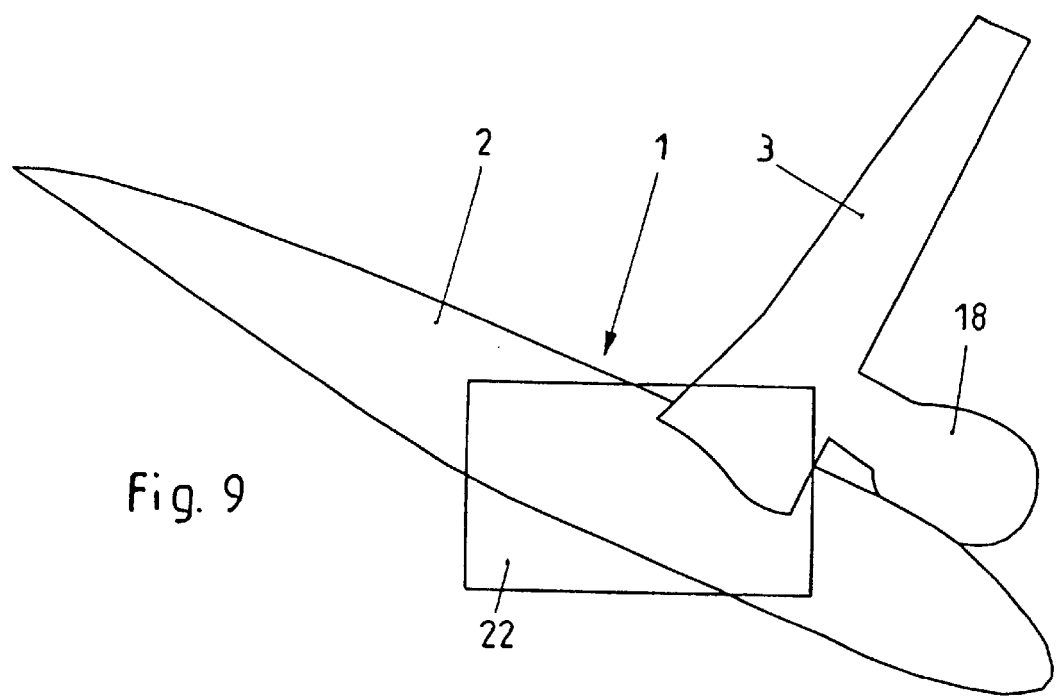
FIG. 9 is a further perspective view of parts of an aircraft with an enlarged detail.
Figure 10:
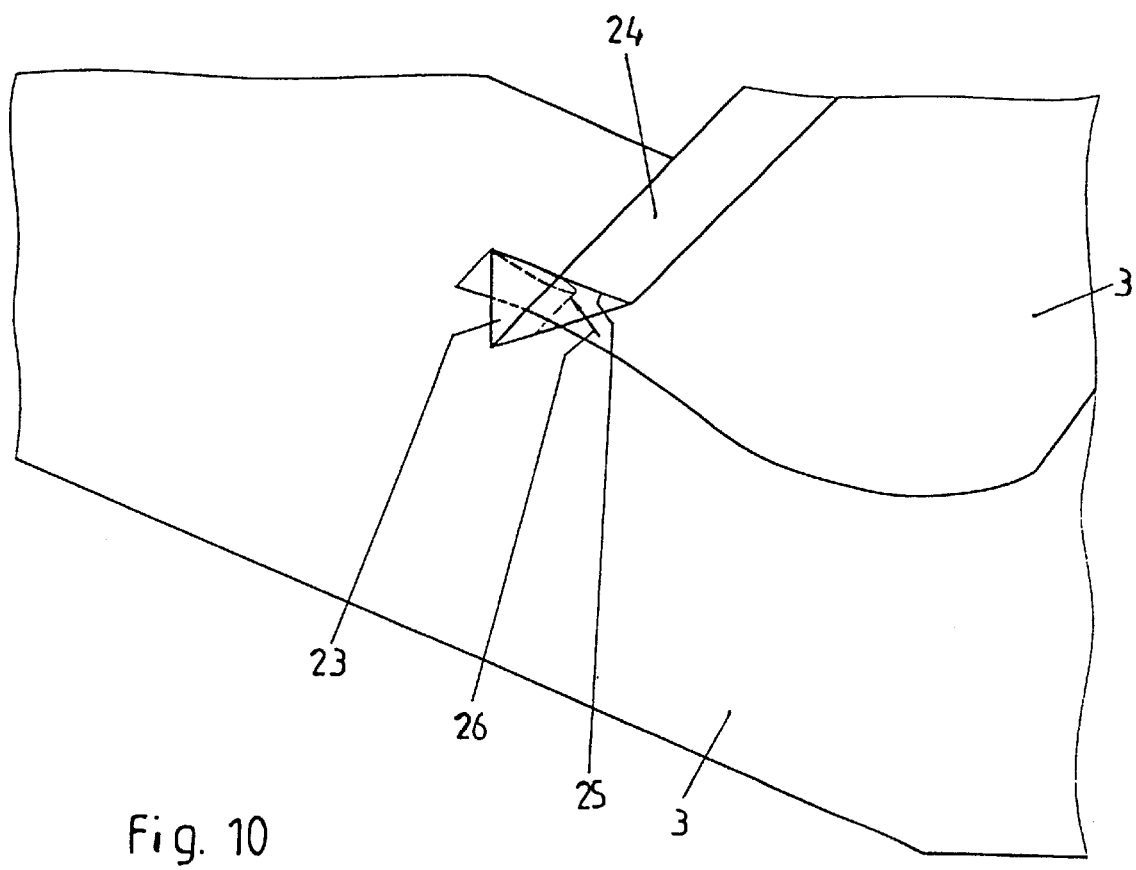
FIG. 10 is enlarged detail as shown in FIG. 9 with a winglet arrangement in the area of an inside edge with an extended landing flap at the aircraft wing.

FIG. 9 is a bottom rear view of the fuselage 2, one wing 3 and one engine 18 of an aircraft 1, again with an edged detail 22 which is depicted enlarged in FIG. 10. FIG. 10 shows the arrangement of a winglet 23 at a wing 3 near an inside edge 25 of a landing flap 24 at the wing 3 in order to reduce the circulation of a flap vortex pair that is generated with extended landing flap 24 at the inside edge 25 and has a spin direction that is opposed to that of the wing vortex pair $+/-\Gamma_M$ as shown in FIG. 1. This flap vortex pair is absorbed by the interfering vortex pair $-/+\Gamma_P$. Its circulation must be considered accordingly when the circulation $\Gamma_P$ is to be introduced into the range of values 11 as shown in FIG. 3. The oncoming airflow of the winglets 23 is illustrated by an arrow 26.

Figure 11:
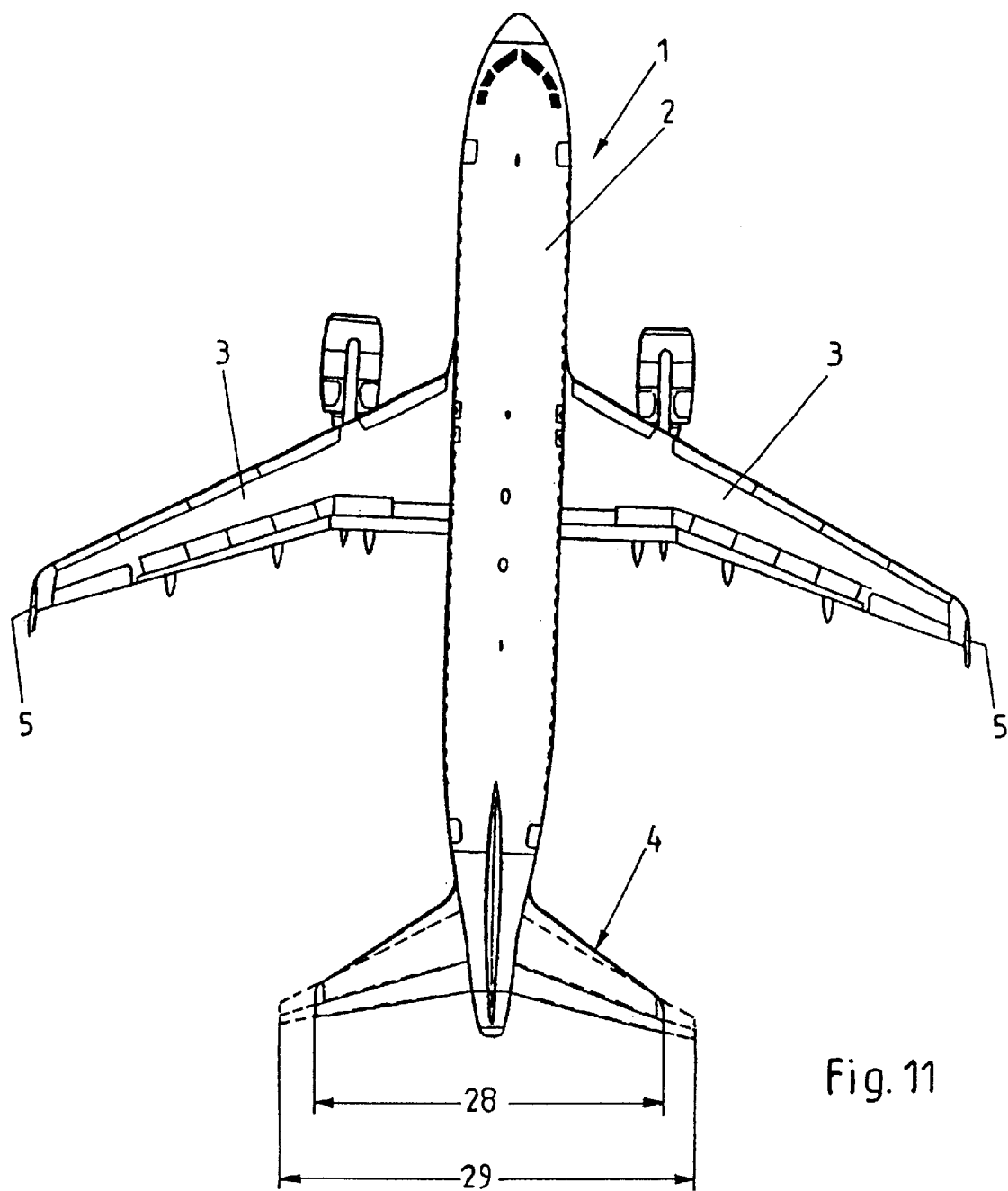
FIG. 11 illustrates an aircraft similar to an Airbus A-320, with the dotted line depicting a modified horizontal tail plane.

FIG. 11 shows an aircraft that is similar to an A-320. The horizontal tail plane of this aircraft, according to Jane's All the World's Aircraft, edition 2000–2001, has a relative span of $b_H/b_M$=0.365 and an aspect ratio of $\Lambda_H$=5.0. The circulation ratio is calculated with the moment coefficient to be:

$$\Gamma_H/\Gamma_M=0.65.$$

The fuselage vortex pair, due to the wing-fuselage transition area, has an estimated relative circulation of $\Gamma_F/\Gamma_M$= 0.18 at a relative span of $b_F/b_M$=0.11. For both vortices together, according to equations (1) and (2) with $\Gamma_S$=0 the following applies $$\Gamma_P/\Gamma_M=0.83,$$

and $$b_P/b_M=(0.65\times0.365+0.18\times0.11)/0.83=0.3096\approx0.31.$$

Thus the circulation ratio $\Gamma_P/\Gamma_M$, in FIG. 3 is in the marked spot P. A premature destruction of the vortex cannot be expected in this case since the opposed vortices escape to the above. An increase of the relative span of the horizontal tail plane 4 from 0.365 to 0.42, which corresponds to an increase of its real span 28 from 12.45 m to a modified span 29 of 13.8 m, reduces—at the same aerodynamic downward lift—the relative circulation to $$\Gamma_H/\Gamma_M=0.56,$$

so that the relative circulation $$\Gamma_P/\Gamma_M=0.74$$

and the relative span of the interfering vortex is now $$b_P/b_M=(0.56\times0.42+0.18\times0.11)/0.74=0.346\approx0.35.$$

This measure shifts the design point P of the A-320 to the point P' in the hatched area 27 as shown in FIG. 3, where a 40% portion of the interfering vortex pair with an opposed circulation of ~30% (0.74×0.4=0.296) that is sufficient for a premature breakdown of the wing vortex pair, descends with the wing vortex pair. The unchanged downward lift force increases the aspect ratio of the horizontal tail plane from 5 to 6.6.

Figure 12:
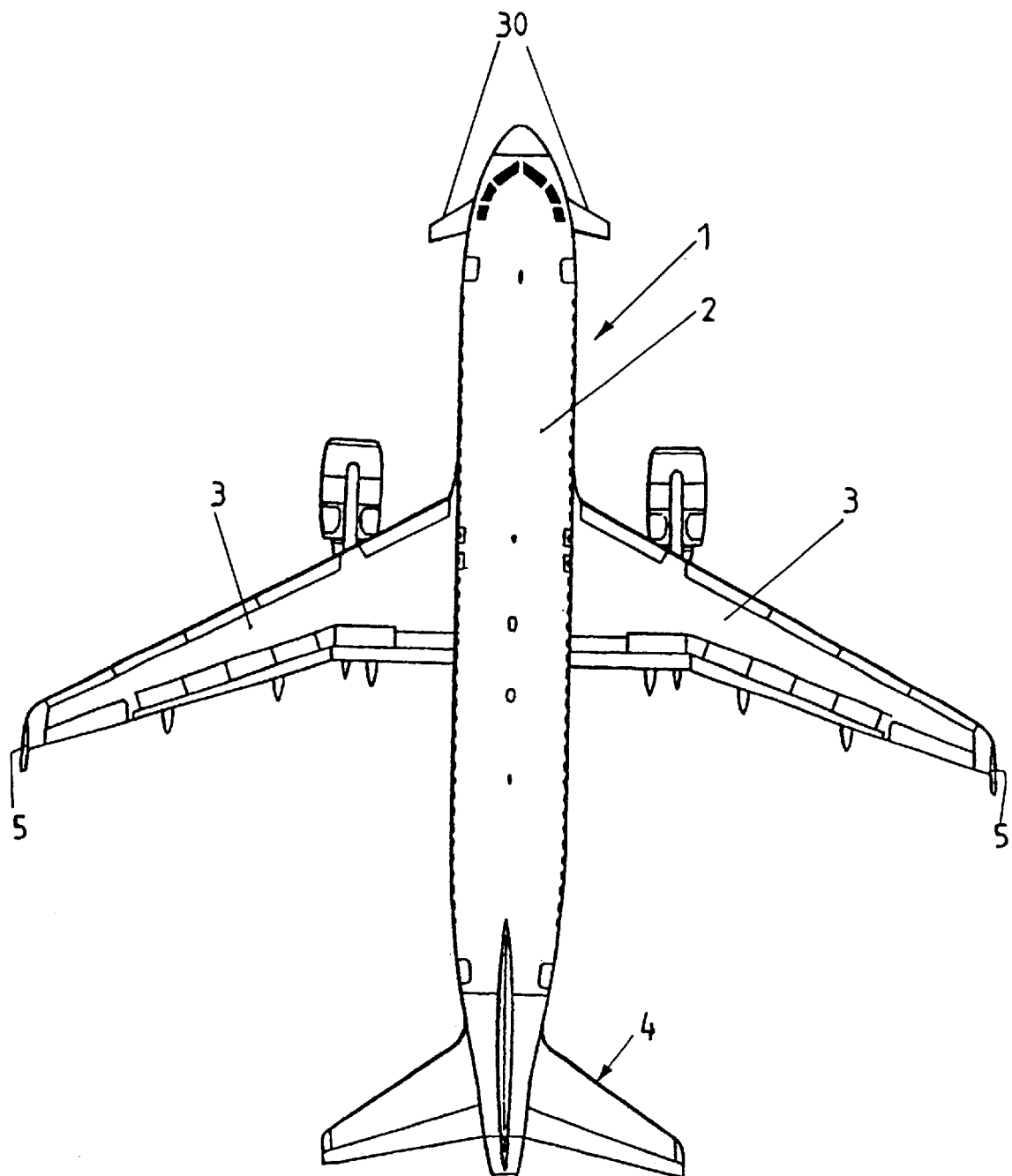
FIG. 12 illustrates an aircraft with a conventional horizontal tail plane and a canard wing.

FIG. 12 shows the same aircraft as in FIG. 11 with an additional canard wing before the wing. Thus an additional trim moment is generated, which relieves the conventional horizontal tail plane, and as a consequence, reduces the circulation $\Gamma_H$ of the tail plane vortex pair. The canard wing in turn generates a descending vortex pair with the circulation $+/-\Gamma_S$ that is to be subtracted from $\Gamma_H+\Gamma_F$. At the same time the relative span bp of the interfering vortex pair is increased as a result of the descending vortex pair of the canard wings. Similar as in the preceding example, this is the shortest possible route to get from the bottom to the favorable hatched area 27 as shown in FIG. 3.

List of Reference Numerals

1—Aircraft
2—Fuselage
3—Wings
4—Horizontal tail plane (HTP)

5—Wing tip
6—Lift
7—Symmetry plane
8—HTP downward lift
9—Lift loss over fuselage
10—Vortex generator
11—Range of values
12—Boundary line
13—Boundary line
14—Range of values
15—Range of values
16—Winglet
17—Arrow
18—Engine
19—Enlarged detail
20—Winglet
21—Stream line
22—Enlarged detail
23—Winglet
24—Landing flap
25—Inside edge
26—Oncoming airflow
27—Hatched area
28—Span
29—Span
30—Canard wing

We claim:

1. An aircraft comprising a symmetry plane, two wings, a fuselage, a horizontal tail plane (HTP) and means for a premature breakdown of a wing vortex pair $+/-\Gamma_M$, which
is generated at the aircraft in the area of the wing tips,
has a first spin direction with regard to said symmetry plane and
descends behind the aircraft,
said means for a premature breakdown adjusting an interfering vortex pair $-/+\Gamma_P$, which
is generated between the fuselage andf the wings tips without merging with the wing vortex pair already in the near field behind the wings,
has a second spin direction with regard to said symmetry plane that is opposed to the first spin direction and
includes portions of a fuselage vortex pair $-/+\Gamma_F$, which is generated by the wing-fuselage junction, and of a tail plane vortex pair $-/+\Gamma_H$, which is generated in the area of the wing tips (5) of the horizontal tail plane (4),
to suitable values regarding its circulation $\Gamma_M$ and the relative span of the interfering vortex pair, each related to the wing vortex pair, in order to retain the interfering vortex pair $-/+\Gamma_P$ behind the aircraft in an altitude range that is the same as an altitude range of the descending wing vortices of the wing vortex pair.

2. The aircraft according to claim 1, wherein the means for a premature breakdown reduce the interfering vortex pair circulation $\Gamma_P$, as compared to the added up portions of the wing vortex pair $-/+\Gamma_F$ and the horizontal tail plane vortex pair $-/+\Gamma_H$.

3. The aircraft according to claim 2 wherein, the means for a premature breakdown include at least one winglet pair.

4. The aircraft according to claim 3, wherein said winglet pair is arranged at the fuselage behind the wings.

5. The aircraft according to claim 3, wherein said winglet pair is arranged at the wing tips of the horizontal tail plane.

6. The aircraft according to claim 3 and further having a pair of landing flaps with inside edges at its wings, wherein said winglet pair is arranged at the inside edges of the landing flaps.

7. The aircraft according to claim 1 and further having a pair of landing flaps with inside edges at its wings, wherein the interfering vortex pair $-/+\Gamma_P$ additionally includes a portion of a flap vortex pair that is generated in the inside edge area of the landing flaps.

8. The aircraft according to claim 1, wherein said means for a premature breakdown further have a pair of vortex generators which generate a further vortex pair $+/-\Gamma_S$ the interfering vortex pair $-/+\Gamma_P$ further including a portion of the further vortex pair.

9. The aircraft according to claim 3, wherein the active length of said winglet pair is adjustable to the specifically suitable values in order to adjust the circulation and the relative span of the interfering vortex pair $-/+\Gamma_P$.

10. The aircraft according to claim 3, wherein the angle of attack a of said winglet pair is adjustable to the specifically suitable value in order to adjust the circulation and the relative span of the interfering vortex pair $-/+\Gamma_P$.

11. The aircraft according to claim 2, wherein said means for a premature breakdown reduce the relative circulation of the interfering vortex pair $-/+\Gamma_P$ to a value that remains higher than 15% related to the circulation of the wing vortex pair $+/-\Gamma_M$.

12. The aircraft according to claim 1, wherein said means for a premature breakdown include a horizontal tail plane having a span ratio to the wings of $b_H/b_M > 0.37$ and an aspect ratio of $\Lambda_H > 6$.

13. The aircraft according to claim 2, wherein said means for a premature breakdown include a canard wing with a span ratio to the wings of $b_S/b_M < 0.2$ and an aspect ratio of $\Lambda s < 3$, the canard wing generating a further vortex pair $+/-\Gamma_S$ with the first spin direction and the interfering vortex pair $-/+\Gamma_P$ having a portion of the further vortex pair.

* * * * *